UNITED STATES PATENT OFFICE.

WILLIAM STANLEY COOKSON, OF TAIPING, PERAK, STRAITS SETTLEMENTS, ASSIGNOR TO LULU MITCHELL SMITH, OF MAUNAWAI, HONOLULU, HAWAIIAN ISLANDS.

CONCENTRATED COCOANUT-MILK AND PROCESS OF MAKING SAME.

1,374,879. Specification of Letters Patent. Patented Apr. 12, 1921.

No Drawing. Application filed February 25, 1919. Serial No. 279,166.

*To all whom it may concern:*

Be it known that I, WILLIAM STANLEY COOKSON, a subject of the King of Great Britain, and a citizen of Straits Settlements, residing at Taiping, in the State of Perak, Straits Settlements, have invented certain new and useful Improvements in Concentrated Cocoanut-Milk and Processes of Making Same, of which the following is a specification.

My invention relates to improvements in concentrated cocoanut milk and the process of making the same, and it consists in the steps hereinafter set forth and in the product obtained thereby.

An object of my invention is to produce a new vegetable food product, similar in composition to a pure, rich, natural cream.

A further object of my invention is to provide a product of the kind described which has excellent keeping qualities without the addition of chemicals or preservatives of any kind.

A further object of my invention is to provide a concentrated cocoanut milk which, by dilution with pure water to from four to ten times its original volume, provides a product varying in richness from that of ordinary dairy cream down to that of ordinary rich dairy milk, with full cream, and one which is suited to all uses to which dairy milk and cream are ordinarily put.

A further object of my invention is to provide an improved process for manufacturing concentrated cocoanut milk.

Other objects and advantages will appear in the following specification, and the novel features of the invention will be particularly pointed out in the appended claims.

In carrying out my invention I make use of fresh cocoanut or clean copra as raw material. If fresh cocoanuts are taken, it is preferable, although not essential, to have them of a certain degree of ripeness, *i. e.*, a stage before the oil content of the cocoanut has reached its maximum, and before the sugar content has reached its minimum. This stage is reached at about the time when the watery contents of the ripening cocoanut have been sufficiently reduced in volume to be barely perceptible on shaking. At a later stage the watery contents will shake audibly.

If the fresh cocoanuts are taken as raw material, the husk of the cocoanut (epicarp and mesocarp) may be removed or not, as desired. The cocoanut is opened by splitting, sawing, breaking, or by any other suitable means, and the pericarp is removed. The endosperm (albumin or "white meat") is removed by rasping, scraping, grinding, cutting, breaking, or in any other suitable manner.

Where copra is used as raw material, the process begins with the following steps: The endosperm from the copra, or from the fresh cocoanut as above described, is reduced to a more or less finely divided state either in the presence of water, such as the water of the cocoanut, or other water, or else a quantity of water or some similar liquid is added after the endosperm has been reduced to a satisfactory state of division, that is to say, to pieces ranging in weight from one gram downward, and of any shape. The quantity of water added will run from an amount equal to one quarter by weight of the endosperm used, up to any convenient amount, usually not exceeding one half the weight of the endosperm used.

The endosperm, with its added liquid, is squeezed or subjected to pressure, either by hand or in any kind of press, moisture expeller, or in any other mechanical contrivance, or by rolling, or by a combination of rolling and abrasion, or by any kind of screw action, or by action similar to that of a mortar and pestle, with the object of separating from the solid constituents of the endosperm the liquids originally contained therein, in the form of emulsions or otherwise, in addition to the liquid added to the endosperm. Instead of using mechanical means for extracting the liquid portions of the endosperm from the solid portion, they may be extracted with carbon tetrachlorid, petroleum ether, chloroform, or any other fat solvent.

The steps thus far described will result in two products,—one comprising the solid constituents of the endosperm, plus such of the liquids as may resist separation therefrom, and the other the residual liquid. The present application deals primarily with the residual liquid. This product is composed of water, cocoanut oil, sugar in solution, albuminoid and other proteins, and possibly, traces of other constituents, all in an emulsified state. This emulsified product I call "cocoanut milk." This cocoanut milk is concentrated by means of evaporation, either in the open, or under reduced atmospheric pressure, as in a vacuum pan, or by separation on the principle of an ordinary centrifuge, or cream separator; or it is coagulated or flocculated by heat or chemicals, until it is wholly anhydrous, or within any desired percentage of being so. During the processes of concentration described herein, the temperature of the product must not exceed 80° centigrade. This is essential. At temperatures substantially above 80° C., the proteids which act as emulsifying agents are moreover less coagulated, and it is to maintain the emulsion unbroken that the temperature must be maintained below that specified.

The resulting product, which is concentrated cocoanut milk, consists of approximately 70% of pure cocoanut oil, 12% of proteid or albuminous matter, 12% of sugar, and 6% of water. This product is substantially permanent under normal conditions, is substantially free from rancidity and is an emulsion having a consistency something like that of more or less thin starch paste and is capable by the addition of water and stirring of being reconverted into a thinner emulsion. This composition may be varied to suit different uses by withdrawing any portion, or all, of any of the constituents, or by the addition of water. The concentrated cocoanut milk may be reduced to a powder by instantaneous heating to a high temperature, after the manner in which milk powders are made.

The protein and sugar content of the product may be increased, (and of course, that of the oil reduced,) by adding to the product either during the stage during which the endosperm is being reduced to a finely divided state, or later, a quantity of the protein and sugar solution contained in the cocoanut milk, as described above. This protein and sugar solution is obtained by taking a further quantity of the cocoanut milk (other than that to be used for concentration) and permitting it to separate by gravity, when the sugar and protein solution to be used will sink and the oily emulsion will rise. The sugar and protein solution described above can then be used for addition to the cocoanut milk which is to be concentrated.

I claim:

1. The herein described food product, substantially permanent under normal conditions which consists of a concentrated cocoanut milk emulsion which is substantially free from rancidity and which contains substantially 70% pure cocoanut oil, 12% proteid or albuminous matter, 12% sugar and 6% water, the whole having a consistency approximating that of starch paste and being capable of being converted into a thinner emulsion by adding water and stirring.

2. A new food product consisting of concentrated cocoanut milk which has a viscosity approaching that of starch paste and which is an emulsion of the liquid extract of the endosperm of the cocoanut, being dilutable by water to an emulsion of a cream-like or milk-like consistency and containing the sugar and proteid originally present in the endosperm in a substantially unchanged condition and also containing pure cocoanut oil or fat and water.

3. The herein described process of preparing a concentrated cocoanut milk which consists in treating the comminuted cocoanut endosperm with water, extracting the liquid content of the endosperm and concentrating the resulting liquid by driving out a portion of its water content at a temperature not exceeding 80° C.

4. The herein described process of preparing a concentrated cocoanut milk which consists in treating the comminuted cocoanut endosperm with water, extracting the liquid content of the endosperm and concentrating the resulting liquid by removing a portion of its water content at a temperature below that at which substantial coagulation of the proteid present, and substantial caramelization of the sugar present takes place.

WILLIAM STANLEY COOKSON.